United States Patent

Esclar et al.

[11] Patent Number: 5,878,923
[45] Date of Patent: Mar. 9, 1999

[54] METHOD AND APPARATUS FOR DISPENSING A PLURALITY OF MEASURED QUANTITIES OF THE SAME LIQUID

[75] Inventors: Dominique Esclar, Herpy L'Arlesienne; Pierre Louis Carmona, Gagny; Michel Gaubert, Goussainville; Pascal Sterle, Soisy-Sous-Montmorency, all of France

[73] Assignee: L'Oreal, Paris, France

[21] Appl. No.: 888,626

[22] Filed: Jul. 7, 1997

[30] Foreign Application Priority Data

Jul. 29, 1996 [FR] France .................................. 96 09522

[51] Int. Cl.⁶ .................................................. B65D 83/00
[52] U.S. Cl. ........................................... 222/394; 222/450
[58] Field of Search ...................... 222/394, 425, 222/450

[56] References Cited

U.S. PATENT DOCUMENTS 3,667,653  6/1972  Loewenthal ............................. 222/362
4,974,754  12/1990 Wirz ........................................ 222/450
5,125,540  6/1992  Rodriguez ............................... 222/450

FOREIGN PATENT DOCUMENTS

2027184 A  1/1971  Germany.

Primary Examiner—Philippe Derakshani
Attorney, Agent, or Firm—Oliff & Berridge, PLC

[57] ABSTRACT

The invention relates to apparatus for simultaneously dispensing a plurality of measured quantities of a liquid, the apparatus comprising:

a slide-valve body, a succession of liquid accumulation chambers, respective expulsion gas feed channels associated with said chambers, a selector member movable in said housing between a filling position and a dispensing position, and sealing structure placed in said housing between the slide-valve body and the selector member. When the selector member is in the filling position, liquid flows through the various chambers in succession, and when the selector member is in the dispensing position, the liquid contained within each chamber can flow out under the action of said expulsion gas.

11 Claims, 3 Drawing Sheets

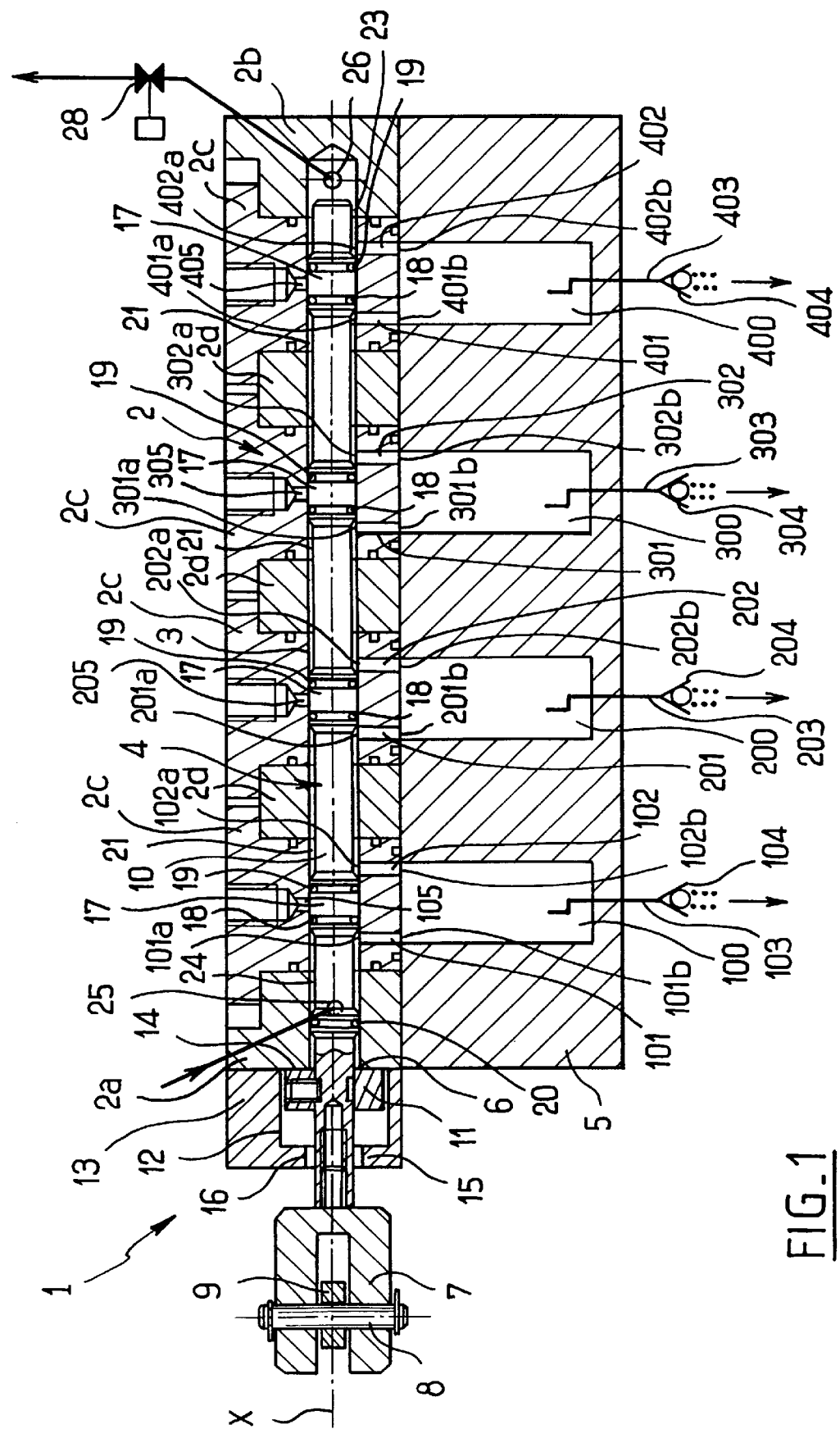
FIG_1

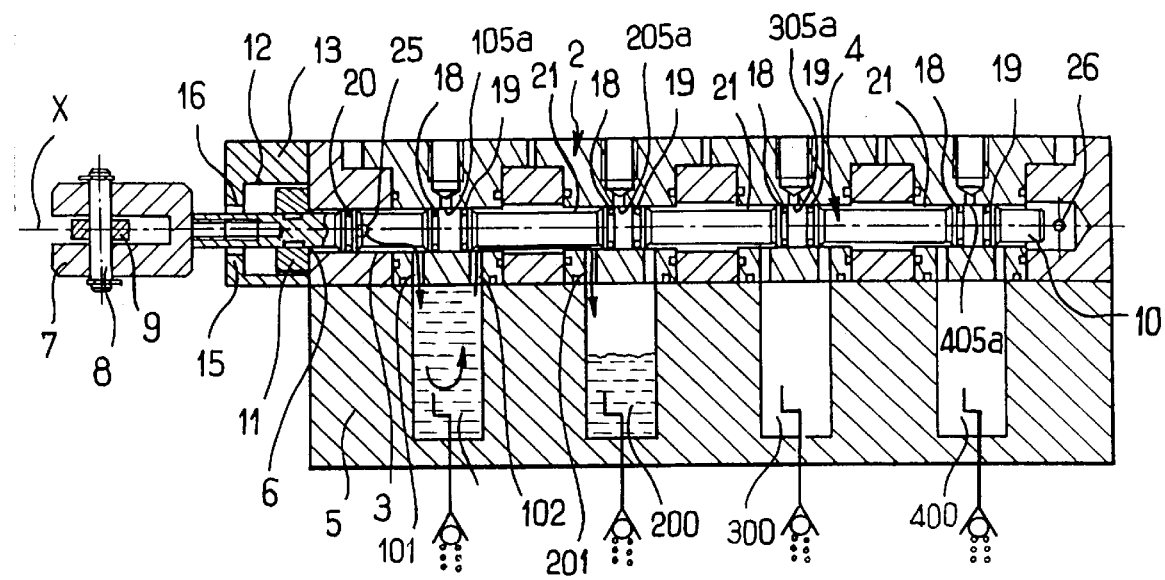
FIG_2
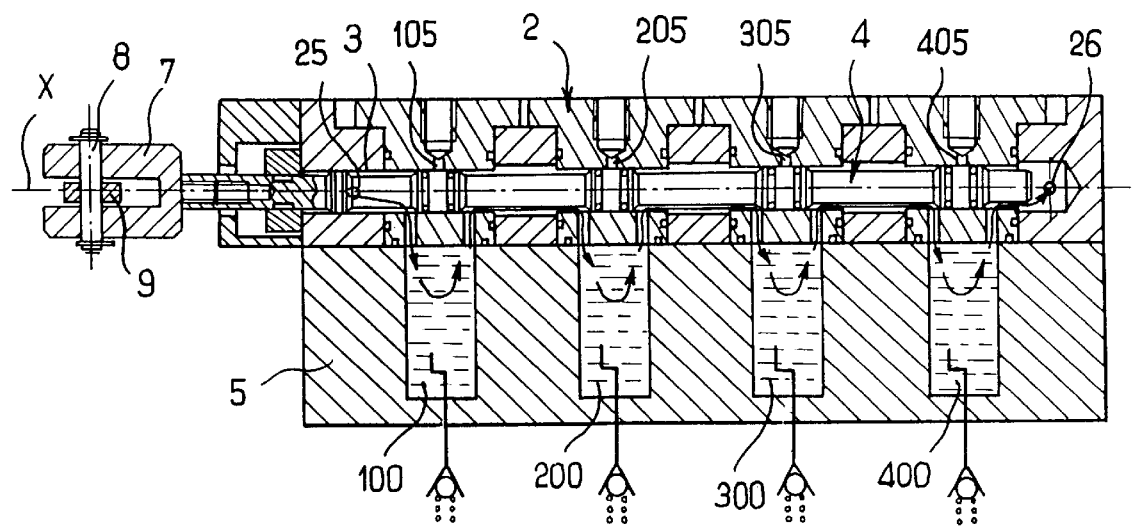
FIG_3

METHOD AND APPARATUS FOR DISPENSING A PLURALITY OF MEASURED QUANTITIES OF THE SAME LIQUID

The present invention relates to simultaneously dispensing a plurality of measured quantities of a liquid, and particularly, but not exclusively, using a liquid to fill a plurality of individual sample-treatment vessels having a volume that is typically of the order of a few cm$^3$.

BACKGROUND OF THE INVENTION

One solution for simultaneously dispensing a plurality of measured quantities of a liquid into individual treatment vessels consists in providing as many valves as there are vessels, the valves being connected firstly to a common source of said liquid, and secondly to filler orifices opening out respectively into said vessels. The time each valve is open serves to control the quantity of liquid dispensed. That solution rapidly becomes very expensive to implement when the treatment vessels are numerous and a plurality of successive treatment or rinsing liquids need to be delivered to the vessels, since the number of valves needs to be multiplied accordingly. Also, there can be a problem of bulk due to the number of valves.

OBJECTS AND SUMMARY OF THE INVENTION

An object of the present invention is to provide apparatus enabling a plurality of measured quantities of a liquid to be dispensed simultaneously, which apparatus is relatively simple and cheap.

The invention achieves this by the fact that the apparatus comprises:

a slide-valve body having a housing into which there opens out at least one feed inlet for said liquid;

a succession of liquid accumulation chambers communicating via respective inlet orifices and outlet orifices with said housing and via respective liquid-dispensing outlets with the outside, each of said outlets being provided with respective shutter means capable of being opened to dispense the liquid;

respective expulsion gas feed channels associated with said chambers;

a selector member movable in said housing between a filling position and a dispensing position; and sealing means placed in said housing between the slide-valve body and said selector member, the member and the body being shaped and said sealing means being positioned in such a manner that when said selector member is in the filling position, they define passages for the liquid in said housing between the outlet orifice from each chamber and the inlet orifice to the following chamber to force the liquid to flow from said feed inlet for said liquid through the various chambers in succession, and when the selector member is in the dispensing position, to isolate said passages to make it possible, when said shutter means associated with each chamber are opened, for the liquid contained within each chamber to flow out through the corresponding liquid-dispensing outlet under the action of said expulsion gas.

By means of the invention, the number of measured quantities of liquid that can be dispensed in individual vessels can be extended easily and in a manner that is relatively cheap.

In a particular embodiment of the invention, said expulsion gas feed channels open out into said housing and are isolated by said sealing means when said selector member is in the filling position.

In a particular embodiment of the invention, said sealing means are carried by the selector member.

In a particular embodiment of the invention, the selector member is elongate in shape and can slide inside said housing.

In a particular embodiment of the invention, each expulsion gas feed channel opens out into said housing via an orifice situated along the path of the selector member, between the inlet and outlet channels of an accumulation chamber opening out into said housing.

In a particular embodiment of the invention, each accumulation chamber communicates with said housing via two parallel channels opening out into the accumulation chamber via its top wall.

Preferably, the above-mentioned passages enabling the liquid to flow from said liquid feed inlet through the various chambers in succession when the selector member is in the filling position, are formed by annular grooves in the selector member.

Preferably, the shutter means are constituted by non-return valves that open when the pressure of the liquid in the associated accumulation chamber exceeds a predetermined value.

In a particular embodiment of the invention, said accumulation chamber has a volume that is adjustable by adjusting a part that holds the corresponding non-return valve.

The invention also provides a method of dispensing a plurality of measured quantities of a liquid simultaneously, the method comprising the steps consisting in:

connecting in series via passages formed between a slide-valve body and a selector member in a given relative position relative to the slide-valve body, a succession of liquid accumulation chambers, with the volume of each chamber corresponding to a predetermined measured quantity of the substance to be dispensed;

filling said chambers by causing liquid to flow from the first chamber to the last chamber, with liquid passing from one chamber to the next via an overflow;

isolating the chambers from one another by displacing the selector member relative to the slide-valve body to close said passages; and delivering an expulsion gas to each chamber to enable the liquid contained in the chamber to escape via an associated liquid-dispensing outlet.

BRIEF DESCRIPTION OF THE DRAWINGS

Other characteristics and advantages of the present invention appear on reading the following detailed description of non-limiting embodiments of the invention, and on examining the accompanying drawings, in which:

FIG. 1 is a diagrammatic section view of apparatus constituting a particular embodiment of the invention;

FIGS. 2 to 4 show various stages in the operation of the apparatus shown in FIG. 1.

MORE DETAILED DESCRIPTION

Figure 4:
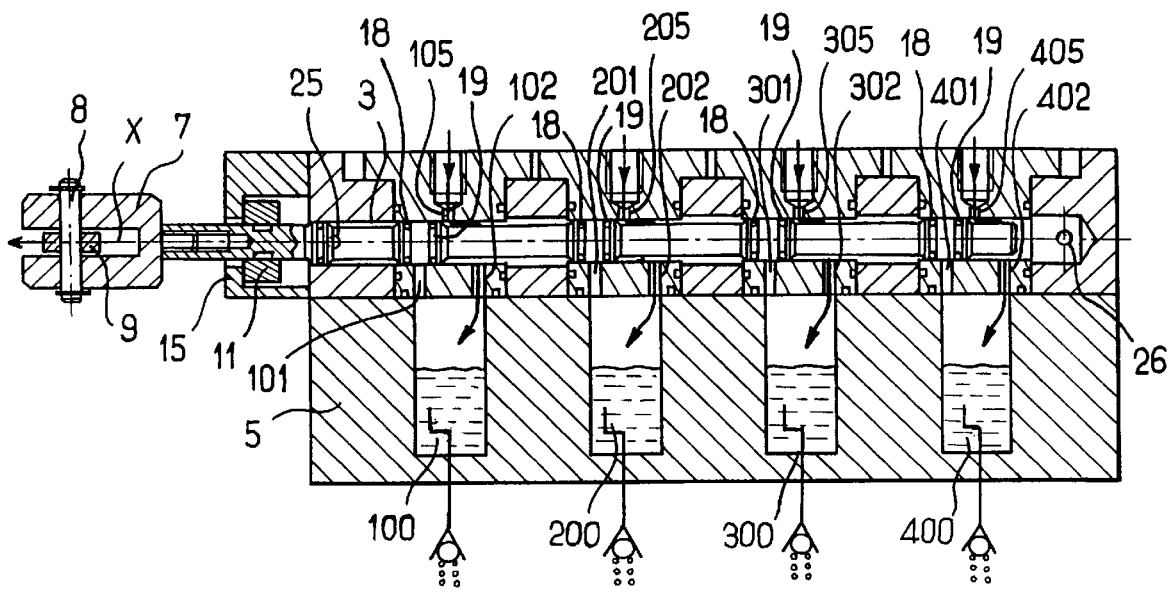

FIG. 1 shows apparatus 1 constituting a particular embodiment of the invention.

The apparatus 1 includes a slide-valve body 2 having a housing 3 slidably receiving a selector member 4 of elongate shape along a longitudinal axis X. The housing 3 is circularly cylindrical about the axis X.

A block 5 is fitted beneath the slide-valve body 2. A plurality of liquid-accumulation chambers are formed in the block 5. There are four of these chambers in the example described, and they are given respective references 100, 200, 300, and 400.

The housing 3 is open at an end 6 situated to the left in the figures, and the selector member 4 projects from the slide-valve body 2 through said end. The selector member 4 comprises a rod 10 partially engaged in the housing 3 with portions 17 spaced part along its length being of circular right section suitable for constituting a sliding fit in the housing 3. At its end situated outside the housing 3, the rod 10 is secured to a fork 7 hinged to an arm 9 by means of a pin 8. The arm 9 can be rotated about an axis perpendicular to the axis X and parallel to the section plane of FIG. 1, so as to move the selector member 4 parallel to the axis X between a position for filling the chambers 100, 200, 300, and 400, corresponding to FIGS. 1 to 3, and a position for dispensing the contents of said chambers, corresponding to FIG. 4.

A stop ring 11 is fixed on the rod 10 outside the housing 3 and moves in a housing 12 formed by adding a part 13 against the face 14 of the slide-valve body 2 through which the rod 10 projects. A hole 16 is formed in the end wall 15 of the housing 12 to pass the portion of the rod 10 which is connected to the fork 7.

When the selector member 4 is in its filling position, the stop ring 11 comes into abutment against the face 14, and when the selector member 4 is in its dispensing position, the stop ring 11 comes into abutment against the end wall 15 of the housing 12.

Each chamber 100, . . . , 400 communicates with the housing 3 via a pair of channels 101, 102, . . . , 401, 402. The channels 101, 102, . . . , 401, 402 are constituted by holes in the slide-valve body 2 on axes perpendicular to the axis X and parallel to the section plane of FIG. 1.

The channels 101, 201, 301, and 401 are referred to as "inlet" channels, while the channels 102, 202, 302, and 402 are referred to as "outlet" channels.

References 101*a*, 102*a*, . . . , 401*a*, 402*a*, designate the orifices whereby the channels 101, 102, . . . , 401, 402 open out respectively into the housing 3, while references 101*b*, 102*b*, . . . , 401*b*, 402*b* designate the orifices whereby the channels 101, 102, . . . , 401, 402 open out into the chambers 100, . . . , 400.

Each chamber 100, . . . , 400 communicate with a liquid-dispensing pipe. To clarify the drawing, the pipes associated with said chambers and referenced 103, . . . , 403 are shown very diagrammatically.

Each pipe 103, . . . , 403 is provided with a non-return valve that opens when the pressure of the liquid contained in the corresponding chamber exceeds a predetermined value. References 104, . . . , 404 designate the non-return valves respectively associated with the pipes 103, . . . , 403. Each non-return valve is advantageously secured to a part (not shown) enabling the position thereof to be adjusted so as to modify the internal volume of the liquid accumulation chamber, and thus the quantity of liquid dispensed via the non-return valve. Outlet orifices for dispensing liquid are provided downstream from the non-return valves 104, . . . , 404. These orifices may be situated at the ends of tubes dipping into individual sample-treatment vessels.

Channels are formed in the slide-valve body 2 to enable a expulsion gas to be fed into each of the chambers 100, . . . , 400 in order to force the liquid contained in said chamber to leave via the associated dispensing pipe 103, . . . , 403. The expulsion gas feed channels are given respective references 105, . . . , 405. Each of the channels 105, . . . , 405 has an end 105*a*, . . . , 405*a* opening out into the housing 3 and an opposite end opening out into the end of a tapped hole for securing a connection endpiece of a pipe connected to a source of expulsion gas. In the particular embodiment described, compressed air is used as the expulsion gas. It would not go beyond the ambit of the invention to replace the non-return valves 104, 204, . . . , 404 with other shutter means such as electrically-controlled valves, and to replace the source of expulsion gas by merely providing communication with ambient air. Under such circumstances, the liquid contained in the accumulation chambers would be dispensed under gravity.

On examining FIG. 1, it will be observed that the axes of the channels 105, . . . , 405 are parallel to the axes of the channels 101, 102, . . . , 401, 402, and that for any particular chamber, the axis of the expulsion gas feed channel is equidistant from the associated inlet and outlet channels. Thus, in the case of the chamber 100, for example, the axis of the channel 105 is equidistant from the axes of the inlet channel 101 and the outlet channel 102. The same applies to the chambers 200, 300, and 400.

Two annular grooves are formed on each portion 17 of the rod 10, which grooves receive respective O-rings. The O-ring situated closer to the end 6 of the housing 3 is referenced 18 while the O-ring situated closer to the opposite end is referenced 19. Each O-ring 18 or 19 is interposed radially between the rod 10 and the wall of the housing 3.

Between the stop ring 11 and the adjacent portion 17, the rod 10 also has an annular groove for receiving an O-ring 20 that is interposed between the rod 10 and the wall of the housing 3.

Between the portions 17, the rod 10 has a circular section of reduced size so as to provide annular interstices 21 in association with the wall of the housing 3. The same applies both between the portion 17 situated furthest away from the end 6 of the housing 3, and the associated free end 22 of the rod 10, and between the annular groove formed to receive the O-ring 20 and the portion 17 closest to the end 6 of the housing 3. This provides annular interstices respectively referenced 23 and 24.

Orifices 25 and 26 open out into the housing 3 respectively to feed the liquid that is to fill the accumulation chambers 100, . . . , 400, and to allow liquid to escape when all of the chambers 100, . . . , 400 are filled. The orifice 26 opens out into the end of the housing 3 and communicates with a pipe 27 provided, in the embodiment described, with a valve 28.

When the rod 10 is in its filling position, i.e. when the stop ring 11 is in abutment against the face 14, the orifice 25 is situated between the O-ring 20 and the O-ring 18 of the portion 17 of the rod 10 adjacent to the end 6 of the housing 3. The O-ring 20 thus prevents liquid from leaving the housing 3 via the end 6.

When the selector member 4 is in the filling position, each pair of O-rings 18 and 19 associated with each portion 17 is situated on either side of an expulsion gas feed channel, thereby isolating it. The O-rings 18 and 19 are also situated between the pairs of channels 101, 102, . . . , 401, 402 associated with the chambers 100, . . . , 400 so as to force the liquid coming from the orifice 25 to pass through the chambers 100, 200, ..., 400 in succession, as explained in greater detail below.

When the selector member 4 is moved to the left in FIG. 1 so as to be brought into the dispensing position, corresponding to FIG. 4, then the pairs of O-rings 18, 19 are situated respectively on opposite sides of the inlet channels 101, ..., 401 so as to isolate the orifices 101a, ..., 401a. Also, each expulsion gas feed channel 105, ..., 405 then opens out to the right of an O-ring 19, such that the expulsion gas feed orifices 105a, ..., 405a are no longer isolated when the selector member 4 is in this position.

The apparatus 1 operates as follows.

To fill the chambers 100, ..., 400, the selector member 4 is brought into the filling position, i.e. it is moved fully to the right as shown in FIGS. 1 to 3, with the stop ring 11 coming into abutment against the face 14. The expulsion gas source is isolated from the channels 105, ..., 405 by an electrically-controlled valve in the closed state and not shown in the figures. The liquid which escapes via the orifice 25 flows into the annular interstice 24, and then via the inlet channel 101 into the first accumulation chamber 100 because of the presence of the first O-ring 18 counting from the left of FIG. 1. Once the chamber 100 is full, the liquid overflows via the outlet channel 102 and flows into the annular clearance 21 defined axially by the first O-ring 19 and by the second O-ring 20. The liquid enters the second chamber 200 via its inlet channel 201, and when this second chamber is full, it overflows via its outlet channel 202. Thereafter it reaches the third chamber via the annular clearance 21 axially defined by the second O-ring 19 and the third O-ring 18. When this chamber is full, the liquid overflows via the outlet channel 302 and thus reaches the annular clearance 21 formed between the third O-ring 19 and the fourth O-ring 18. The liquid penetrates via the inlet channel 401 to fill the last chamber 400, and when this chamber is completely full, the liquid flows via the outlet channel 402 to reach the orifice 26 and be exhausted via the pipe 27, its valve 28 then being open. The non-return valves 104, 204, ..., 404 remains closed during the filling stage since the pressure of the liquid is less than the pressure at which the non-return valve opens. Once the chambers 100, ..., 400 have all been filled, the selector member 4 is moved to the left as shown in FIG. 4, with the stop ring 11 coming into abutment against the end wall 15 of the housing 12. The valve which previously isolated the expulsion gas feed channels 105, ..., 405 is now opened. The valve 28 is closed. The pairs of O-rings 18, 19 no longer isolate the orifices 105a, ..., 405a, but now isolate the inlet channels 101, ..., 401. The orifice 25 is isolated by the O-ring 20 and the first O-ring 18. In this position of the selector member 4, the orifices 105a, ..., 405a communicate respectively with the outlet channels 102, ..., 402. The pressure of the expulsion gas is greater than the pressure at which the non-return valves 104, ..., 404 open, such that the liquid contained in each of the chambers 100, 200, ..., 400 is expelled through the corresponding non-return valve towards a dispensing orifice.

Figure 5:
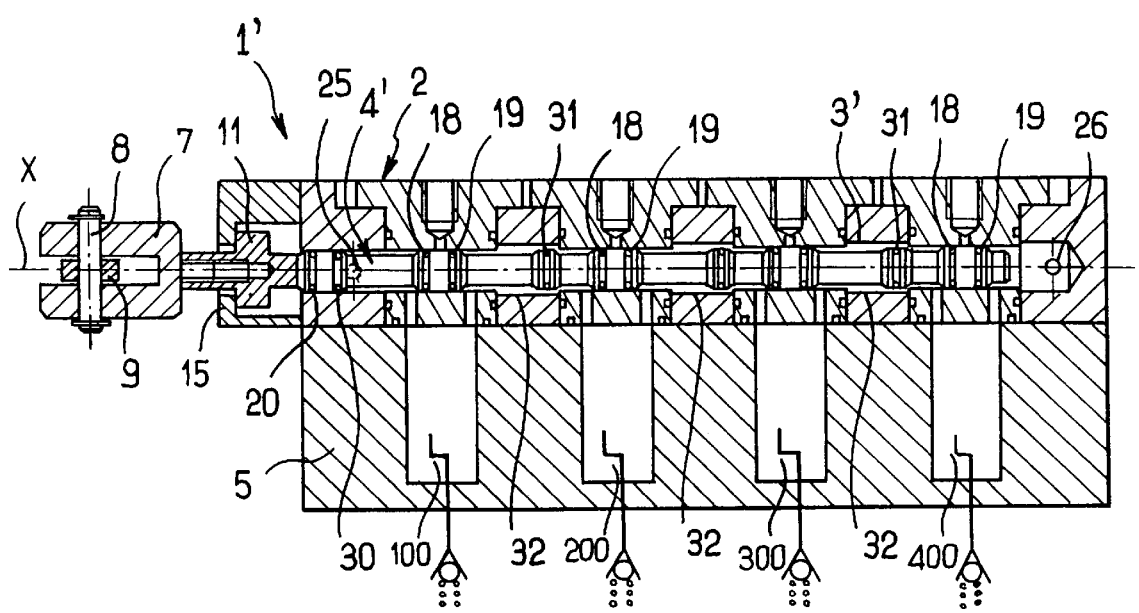
FIG. 5 is a diagrammatic section view of a variant embodiment of apparatus in accordance with the invention.

FIG. 5 shows a various embodiment 1' which differs from the above-described embodiment mainly by the presence of additional O-rings. This figure uses the same numerical references to designate elements that are identical or functionally analogous, and they are not described again in detail.

The selector member, referenced 4', carries an additional O-ring 30 between the O-ring 20 and the first O-ring 18. This O-ring 20 is situated on the selector member 4' in such a manner that when it is in its filling position, as shown in FIG. 5, the liquid feed orifice 25 opens out into the housing 3' between the O-ring 20 and the first O-ring 18, and when the selector member 4' is in the dispensing position, the orifice 25 is isolated between the O-rings 20 and 30.

The selector member 4' also carries four additional O-rings 31 each situated between an O-ring 19 and the following O-ring 18. Annular recesses 32 are formed in the housing 3' to leave space between each O-ring 31 and the wall of the housing 3' when the selector member 4' is in the filling position. This prevents the O-rings 31 blocking the flow of liquid from one chamber to the next during filling. When the selector member 4' is in the filling position, the O-rings 31 are situated close to the right-hand end of each of the recesses 32. Thus, when the selector member 4' is moved to the right to reach the dispensing position, the three O-rings 31 press against the wall of the housing 3' situated between the annular recesses 32 and the channels 201, 301, and 401, respectively. The stroke of the selector member 4' to the right is selected so that the orifices 102a, 202a, 302a, and 402a are isolated by each pair of O-rings 18, 19 when the selector member 4' is in the dispensing position. The expulsion gas flows, for chamber 100, via the annular clearance defined axially by the O-ring 30 and the first O-ring 18, and for the other chambers 200, ..., 400 it flows via the annular clearance provided between an O-ring 31 and the immediately following O-ring 18, flowing from left to right in FIG. 5. The orifice 26 is isolated by an O-ring 19 when the selector member 4' is in the dispensing position, thereby making it unnecessary to provide an electrically-controlled valve for closing the exhaust pipe.

Finally, the invention makes it possible to dispense a plurality of measured quantities of liquid simultaneously without requiring the presence of numerous electrically-controlled valves, and it is particularly suitable for implementing a laboratory machine of a size that is compatible with being installed on a laboratory bench.

Naturally, the invention is not limited to the embodiments described above.

In particular, the O-rings can be received in annular grooves formed in the wall of the housing 3.

Also, the body 2 is made in the embodiments described by assembling together, between two end-pieces 2a and 2b, modular elements 2c and 2d that carry sealing rings 2e and 2f. Naturally, it would not go beyond the ambit of the invention to modify the way in which the body 2 is made.

We claim:

1. Apparatus for simultaneously dispensing a plurality of measured quantities of a liquid, the apparatus comprising:

a slide-valve body having a housing into which there opens out at least one feed inlet for said liquid;

a succession of liquid accumulation chambers communicating via respective inlet orifices and outlet orifices with said housing and via respective liquid-dispensing outlets with the outside, each of said outlets being provided with respective shutter means capable of being opened to dispense the liquid;

respective expulsion gas feed channels associated with said chambers;

a selector member movable in said housing between a filling position and a dispensing position; and sealing means placed in said housing between the slide-valve body and said selector member, the member and the body being shaped and said sealing means being positioned in such a manner that when said selector member is in the filling position, they define passages for the liquid in said housing between the outlet orifice from each chamber and the inlet orifice to the following chamber to force the liquid to flow from said feed inlet for said liquid through the various chambers in succession, and when the selector member is in the dispensing position, to isolate said passages to make it possible, when said shutter means associated with each chamber are opened, for the liquid contained within each chamber to flow out through the corresponding liquid-dispensing outlet under the action of said expulsion gas.

2. Apparatus according to claim 1, wherein said expulsion gas feed channels open out into said housing and are isolated by said sealing means when said selector member is in the filling position.

3. Apparatus according to claim 1, wherein said sealing means are carried by the selector member.

4. Apparatus according to claim 1, wherein said selector member is elongate in shape and can slide inside said housing.

5. Apparatus according to claim 1, wherein each expulsion gas feed channel opens out into said housing via an orifice situated along the path of the selector member, between the inlet and outlet channels of an accumulation chamber opening out into said housing.

6. Apparatus according to claim 1, wherein each accumulation chamber communicates with said housing via two parallel channels opening out into the accumulation chamber via its top wall.

7. Apparatus according to claim 1, wherein said passages are formed by annular grooves in the selector member.

8. Apparatus according to claim 1, wherein said shutter means are constituted by non-return valves that open when the pressure of the liquid in the associated accumulation chamber exceeds a predetermined value.

9. Apparatus according to claim 8, wherein said accumulation chamber has a volume that is adjustable by adjusting a part that holds the corresponding non-return valve.

10. Apparatus according to claim 1, wherein said source of expulsion gas is a source of compressed air.

11. A method of simultaneously dispensing a plurality of measured quantities of a liquid, the method comprising the steps consisting in:

connecting in series via passages formed between a slide-valve body and a selector member in a given relative position relative to the slide-valve body, a succession of liquid accumulation chambers, with the volume of each chamber corresponding to a predetermined measured quantity of the substance to be dispensed;

filling said chambers by causing liquid to flow from the first chamber to the last chamber, with liquid passing from one chamber to the next via an overflow;

isolating the chambers from one another by displacing the selector member relative to the slide-valve body to close said passages; and delivering an expulsion gas to each chamber to enable the liquid contained in the chamber to escape via an associated liquid-dispensing outlet.

\* \* \* \* \*